United States Patent
Kawai et al.

[11] Patent Number: 5,848,114
[45] Date of Patent: Dec. 8, 1998

[54] COMPUTERIZED TOMOGRAPHY SYSTEM

[75] Inventors: Hiroyuki Kawai, Setagaya-ku; Kensuke Sekihara, Musashimurayama; Nagaaki Ohyama, Kawasaki; Masahiro Yamaguchi, Yokohama; Takashi Obi, Yokohama, all of Japan

[73] Assignee: Hitachi Medical Corporation, Tokyo, Japan

[21] Appl. No.: 821,539

[22] Filed: Mar. 21, 1997

[30] Foreign Application Priority Data

Mar. 25, 1996 [JP] Japan ................................ 8-067658

[51] Int. Cl.⁶ .................................................. A61B 6/03
[52] U.S. Cl. ................................................ 378/4; 378/901
[58] Field of Search .............................. 378/4, 15, 901; 250/363.04, 370.09

[56] References Cited

U.S. PATENT DOCUMENTS

| | | | |
|---|---|---|---|
| 5,210,421 | 5/1993 | Gullberg et al. | 250/363.04 |
| 5,253,171 | 10/1993 | Hsiao et al. | 378/4 |
| 5,338,936 | 8/1994 | Gullberg et al. | 250/363.04 |

*Primary Examiner*—David P. Porta
*Assistant Examiner*—David Vernon Bruce
*Attorney, Agent, or Firm*—Antonelli, Terry, Stout & Kraus, LLP

[57] ABSTRACT

A computerized tomography system including an X-ray source for emitting X-rays in a cone-beam shape, a two-dimensional X-ray image acquirer which is arranged so as to face the X-ray source and acquires an image of an object by using the X-rays; and rotator for rotating the X-ray source and the two-dimensional x-ray image acquirer around the object, wherein a three-dimensional reconstructed image is formed from the projection images acquired by the two-dimensional X-ray image acquirer while rotating the rotator. An iterative reconstruction calculator for forming the three-dimensional reconstructed image from the projection images is provided. The three-dimensional reconstructed image without artifacts can be acquired from a small amount of projection data.

7 Claims, 8 Drawing Sheets

COMPUTERIZED TOMOGRAPHY SYSTEM

BACKGROUND OF THE INVENTION

The present invention relates to a computerized tomography system, and more particularly, to a computerized tomography system suitable for acquisition of an image of an object whose position is changed during the image acquisition such as image acquisition of the coronary artery.

Figure 7:
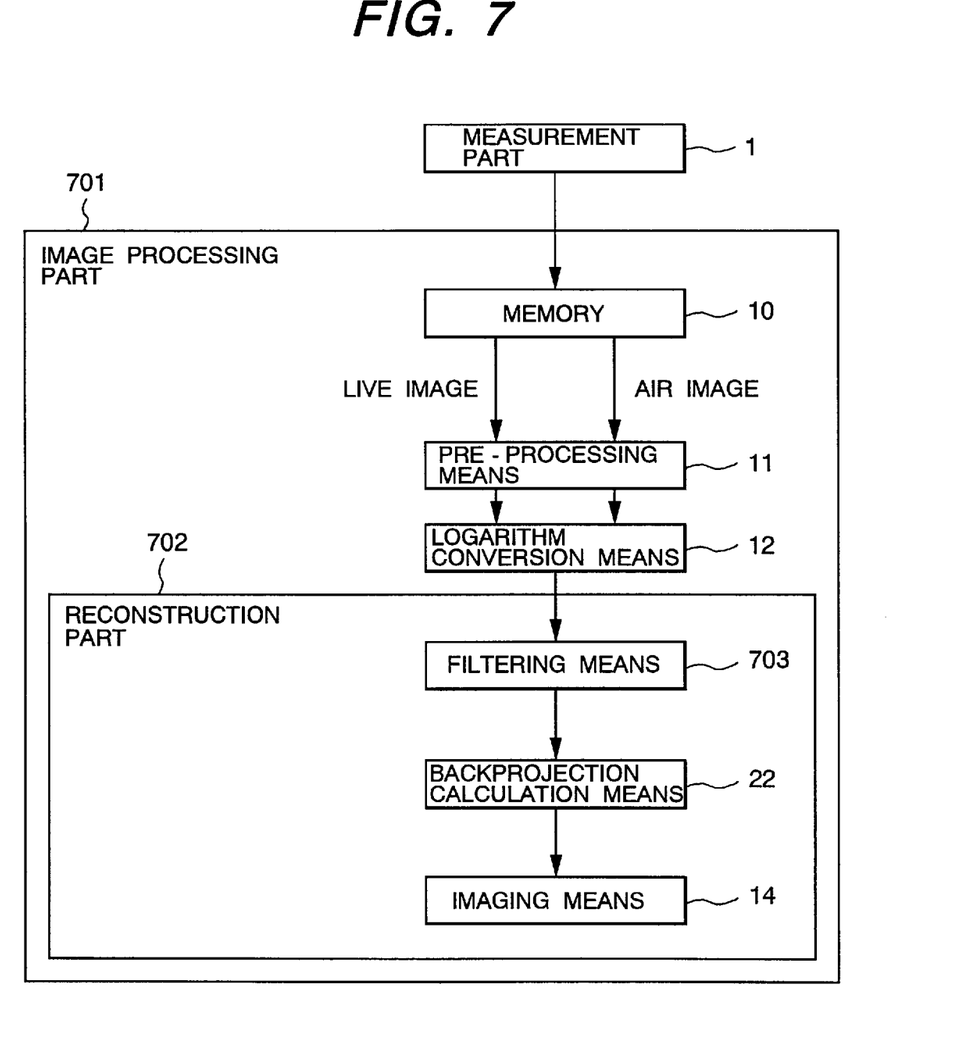
FIG. 7 is a block diagram showing a rough construction of a conventional computerized tomography system.
Figure 8:
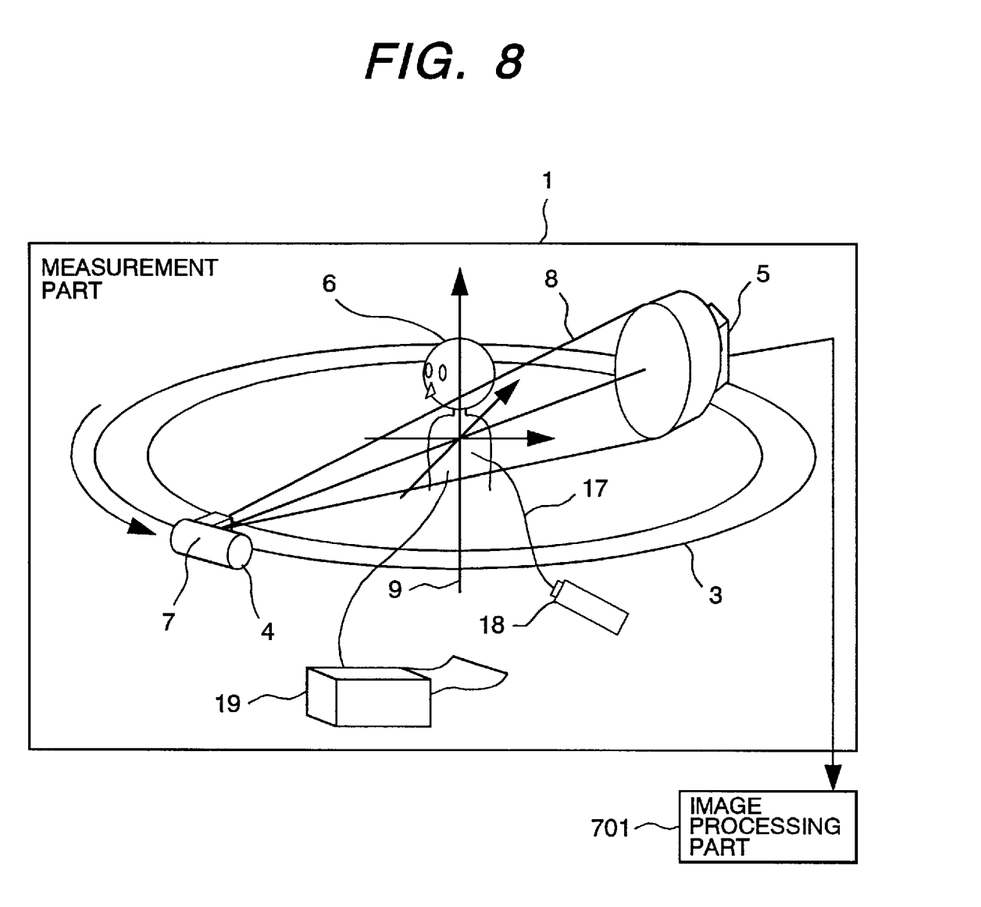
FIG. 8 is a block diagram schematically showing a measurement part of the conventional computerized tomography system.

As shown in FIGS. 7 and 8, a conventional computed tomography system comprises a measurement part 1 for acquiring a two-dimensional X-ray image (projection image) and an image processing part 701 for reconstructing a tomographic image from the projection images. As shown in FIG. 8, an X-ray source 4 and a two-dimensional detector (two-dimensional image acquiring means) 5 are arranged so as to face each other via an object 6 on a scanner (rotating means) 3 in the measurement part 1. The X-ray source 4 emits a cone beam of X-rays 8 having an X-ray focal spot 7 as the apex toward the object 6. The two-dimensional detector 5 measures the intensity of the X-rays 8 which transmitted through the object 6.

The scanner 3 rotates around the object 6 as axis 9 of rotation, so that the X-ray source 4 and the two-dimensional detector 5 rotates around the object 6. Each time the scanner 3 turns by a preset microscopic angle, operations (hereinbelow, called a projection) for emitting X-rays and measuring the intensity of the X-rays transmitted through the object 6 are performed. The operations are repeated for the whole circumference of the X-ray source 4 and a hundred to few hundred sets of transmitted X-ray intensity data are gathered. The angle of rotation of the scanner 3 from a preset position when the projection is performed is called a projection angle.

The transmitted X-ray intensity data measured by the two-dimensional detector 5 is converted into a digital signal. After that, the digital signal is sent to the image processing part 701 which is shown in detail in FIG. 7. In the image processing part 701, the transmitted X-ray intensity data is stored into a memory 10. After that, it is sequentially read out from the memory 10 by a pre-processing part 11 and is subjected to various corrections such as gamma correction and an image deformation correction. In the specification of the invention, the transmitted X-ray intensity data after correction is called a transmitted X-ray image.

A logarithm conversion means 12 performs a logarithm conversion and a sensitivity variation correction to the transmitted X-ray image, thereby converting the transmitted X-ray image to a projection image. A reconstruction part 702 reconstructs a three-dimensional X-ray attenuation coefficient distribution of a visual field region of the object 6 from all of projection images acquired by executing the above-mentioned processes (pre-process).

The three-dimensional reconstructed image is subjected to a known imaging process such as a volume rendering process or a maximum intensity projection process by an imaging means 14, and then, displayed on a display means (not shown).

A cone beam reconstructing operation according to a method of Feldkamp is a known reconstruction method, which is described by L. A. Feldkamp et al., "Practical cone beam algorithm", Journal Opt. Soc. Am. A, Vol. 1, No. 6, 1984, pp. 612–619 (literature 1).

The inventor of the invention found out the following problems when the conventional technique was examined. When an image of the coronary artery is reconstructed by using a conventional computed tomography system, a substance called a contrast medium having an X-ray attenuation coefficient largely different from those of the surrounded tissues is injected to the coronary artery from a contrast injector 18 via a catheter 17 shown in FIG. 8, thereby obtaining contrast of the coronary artery.

Subsequently, projection data for the whole circumference of the heart is acquired by the computerized tomography. Since the positions of the coronary artery of the heart change with time by the heartbeat, the cordiogramof the object in the computerized tomography system is recorded by an electrocardiograph 19 synchronously with the heartbeat.

Since not all of the projection data, however, was acquired when the state of the heart is the same, it is necessary to extract only the projection data acquired when the position of the coronary artery can be regarded as the same by judging from phases of the heartbeats recorded by the electrocardiograph 19 and to reconstruct the image of the coronary artery by using the extracted data. Meanwhile, since burden on the object is increased when the contrast medium is injected to the coronary artery, images are conventionally acquired within a time during which the heat beats about five times.

Consequently, since the number of directions of the projection data when the position of the coronary artery is regarded as the same is about five, data in the sufficient number of projection directions for reconstruction cannot be obtained, and there is a problem such that radial artifacts around the coronary artery into which the contrast medium is injected occur in a reconstructed image. When the artifacts occur in the reconstructed image, it is difficult to extract branches of a small blood vessel.

SUMMARY OF THE INVENTION

It is, therefore, an object of the invention to provide a computerized tomography system which can acquire a three-dimensional reconstructed image in which no artifacts occur from a small amount of projection data. The outlines of representative techniques disclosed in the specification are as follows.

(1) A computerized tomography system comprising: an X-ray source for emitting a cone beam of X-rays; two-dimensional X-ray image acquiring means which is arranged so as to face the X-ray source and acquires an image of an object by using the X-rays; and rotating means for rotating the X-ray source and the two-dimensional X-ray image acquiring means around the object, the system for forming a three-dimensional reconstructed image from projection images acquired by the two-dimensional X-ray image acquiring means while making the rotating means rotate, wherein a iterative reconstruction means for forming the three-dimensional reconstructed image from the projection images is provided.

(2) In the computerized tomography system described in (1), the iterative reconstruction means includes: reconstructing means for acquiring the three-dimensional reconstructed image from the projection images; estimated image calculating means for acquiring an estimated image from the three-dimensional reconstructed image; reprojection calculating means for acquiring a projection image from the three-dimensional reconstructed image; and iterating means for repeatingly executing the calculations by the reconstructing means, the estimated image calculating means, and reprojection calculating means.

(3) In the computerized tomography system described in (2), the estimated image calculating means includes: maximum value detecting means for obtaining the maximum value of the three-dimensional reconstructed image; threshold calculating means for calculating a threshold according to the maximum value; extracted image calculating means for extracting a part in which the pixel value is equal to or larger than the threshold or the pixel value is equal to or less than the threshold from the estimated image, thereby acquiring an extracted image; and image adding means for adding the three-dimensional reconstructed image and the extracted image acquired by the previous iterative reconstructing calculation, thereby acquiring an estimated image.

(4) In the computerized tomography system described in (3), the iterating means has means for finishing the iteration of the calculation according to the threshold.

(5) In the computerized tomography system described in any one of (2) to (4), the iterating means has means for showing the estimated image to the operator and means for finishing the iterating operation when the operator observes the estimated image shown and determines to finish the operation.

(6) In the computerized tomography system described in any one of (2) to (5), the reprojection calculation means includes: image processing means for performing a threshold process to the three-dimensional reconstructed image on the basis of the threshold and adding the threshold processed image to the extracted image acquired from the previous iterating operation, thereby acquiring an extracted image; reprojection calculating means for acquiring a projection image by reprojecting the extracted image acquired by the image processing means; and differential calculation means for calculating the difference between the projection image acquired by the reprojection calculation means and the projection image acquired by the two-dimensional x-ray image acquiring means, thereby acquiring a differential projection image.

(7) In the computerized tomography system described in (6), the reprojection calculation means calculates the projection image in accordance with the following expression (1) when a u-axis is in the tangent direction of the rotation on a imaging plane of the two-dimensional X-ray image acquiring means, a v-axis is in parallel to the axis of rotation, the axis of rotation of the rotating means is set to a z-axis, axes which perpendicularly cross each other each having a crossing point, as the origin, with the z-axis on the plane drawn by the rotating X-ray source are set to x- and y-axes, a distance between the X-ray source and the axis of rotation is SOD, a distance between the X-ray source and the two-dimensional X-ray image acquiring means is SID, the extracted image is set to fv(x,y,z), and a projection image for a projection angle (a) is set to Pv(a,u,v).

$$Pv(a,u,v) = \int_{L(a,u,v)} fv(x, y, z) dl$$

where, $$L(a, u, v): \frac{x + SOD \cos(a)}{SID \cos(a) - u \sin(a)} = \frac{y - SOD \sin(a)}{SID \sin(a) - u \cos(a)} = \frac{z}{v} \quad (1)$$

According to the above means of (1) to (7), the reconstruction calculation means forms the three-dimensional reconstructed image from the projection images acquired by the two-dimensional X-ray image acquisition means. The maximum CT value detecting means obtains the maximum value of the three-dimensional reconstructed image. The threshold calculating means determines the threshold of the CT value on the basis of the maximum value. The foregoing and other objects and novel features of the invention will be apparent from the following description and the accompanying drawings.

DETAILED EXPLANATION OF THE PREFERRED EMBODIMENTS

An embodiment of the invention will be described in detail hereinbelow with reference to the drawings. In the drawings for explaining embodiments of the invention, elements having the same functions are designated by the same reference numerals and repetition of their descriptions is omitted here.

Figure 1:
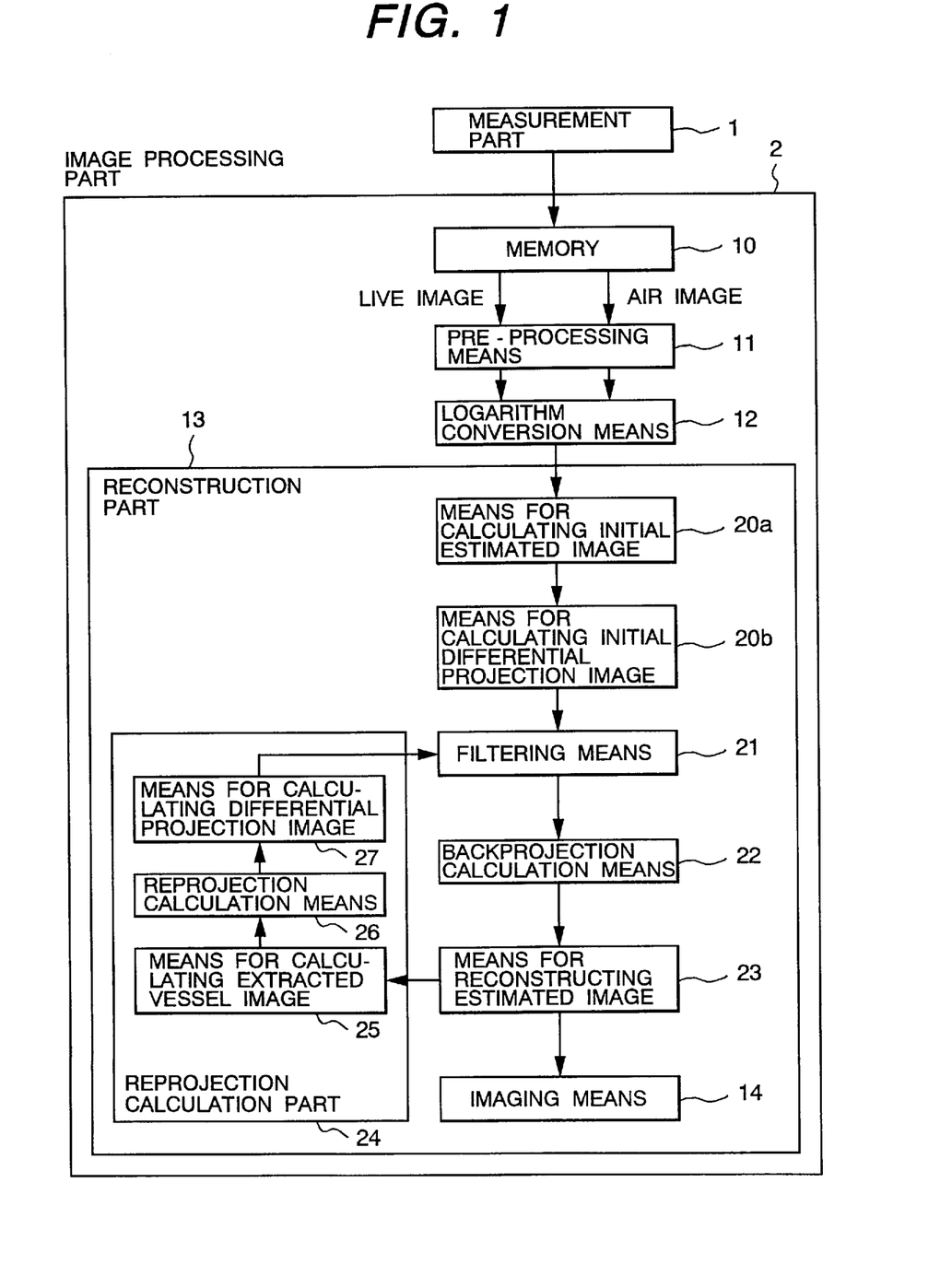
FIG. 1 is a block diagram showing a rough construction of a computerized tomography system according to an embodiment of the invention.

FIG. 1 is a block diagram showing a computerized tomography system of an embodiment of the invention. The computerized tomography system comprises the measurement part 1, image processing part 2, memory 10, pre-processing part 11, logarithm conversion means 12, a reconstruction part (repetitive reconstruction means) 13, imaging means 14, means 20a for calculating an initial estimated image, means 20b for calculating an initial differential projection image, filtering means 21, back projection calculation means (reconstruction means) 22, means 23 for reconstructing an estimated image, reprojection calculation part 24, means 25 for calculating an extracted vessel image (extracted image calculation means), reprojection calculation means 26, and means 27 for calculating a differential projection image. An X-ray image (X-ray projection image or projection image) acquired by the measurement part 1 is subjected to predetermined processes which will be described hereinlater.

Figure 2:
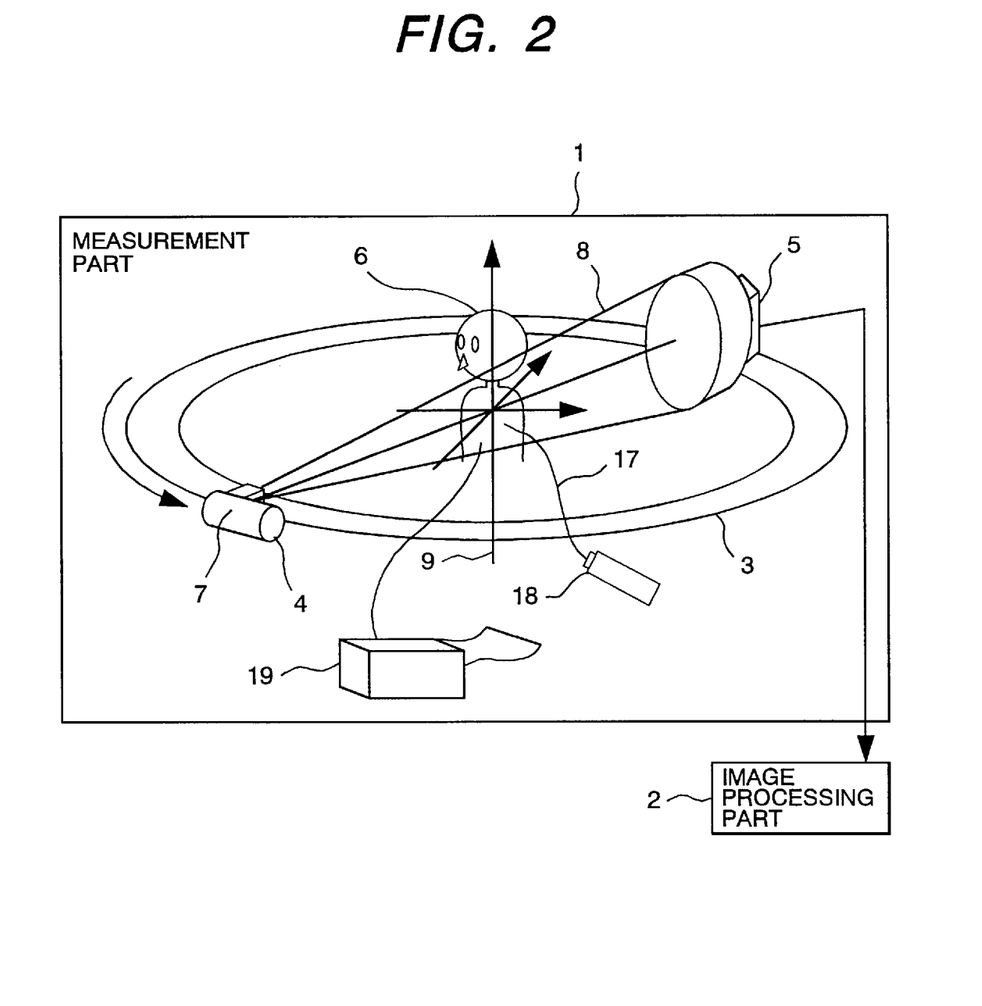
FIG. 2 is a block diagram showing a rough construction of a measurement part of the computerized tomography system according to the embodiment of the invention.

FIG. 2 is a block diagram showing a rough construction of the measurement part 1. The computerized tomography system is constructed by the measurement part 1 for acquiring a two-dimensional X-ray image (projection image) and the image processing unit 2 for reconstructing a tomographic image from the projection images. The X-ray source 4 and the two-dimensional detector (two-dimensional image acquiring means) 5 are arranged so as to face each other through the object 6 on the scanner (rotating means) 3 in the measurement part 1. The X-ray source 4 emits a cone beam of X-rays 8 having the X-ray focal spot 7 as the apex toward the object 6. The two-dimensional detector 5 measures the intensity of the X-rays 8 which transmitted through the object 6.

The scanner 3 rotates around the object 6 as the axis 9 of rotation, thereby rotating the X-ray source 4 and the two-dimensional detector 5 around the object 6. Each time the scanner 3 turns by a preset microscopic angle, operations (hereinbelow, called a projection) for irradiating X-rays and measuring the intensity of the X-rays transmitted through the object 6 are repeated for the whole circumference of the X-ray source and a hundred to few hundred sets of transmitted X-ray intensity data are acquired. A rotation angle of the scanner 3 from the preset position when the projection is performed called an angle of projection.

The transmitted X-ray intensity data measured by the two-dimensional detector 5 is converted into a digital signal and then sent to the image processing part 2 which is shown in detail in FIG. 1. The contrast medium is injected into the coronary artery of the object 6 by the contrast injector 18 via the catheter 17. The cardiogram of the object is recorded by the electrocardiograph 19. In the computerized tomography system of the embodiment shown in FIG. 1, the processing and operating parts and means except the measurement part 1 and the memory 10 are realized by programs.

The memory 10 is a known storing unit, for example, semiconductor memory, disk storage unit, optical disk unit, tape unit, or the like, which stores digital information (transmitted X-ray intensity data) of the X-ray image acquired by the measurement part 1. In the memory 10, the transmitted X-ray intensity data of the X-ray image acquired without laying the object 6 and that of the X-ray image acquired while injecting the contrast medium to the object 6 are separately stored.

In the embodiment, the X-ray image acquired without laying the object 6 is called an air image and the X-ray image acquired while injecting the contrast medium to the object 6 is called a live image, which are expressed as Iair (a,u,v) and Ilive (a,u,v), respectively, by using the (a,u,v) coordinate system to be described later.

Instead of the air image, an X-ray image (called a mask image) acquired with the same image acquisition parameters as those of the acquisition of the live image except that the contrast medium is not injected to the object 6 can be also used. When the mask image is used in place of the air image, the contrasted blood vessel image can be more clearly extracted.

The pre-processing part 11 sequentially reads out the transmitted X-ray intensity data stored in the memory 10, corrects dark current bias, sensitivity variation, image deformation, and the like every transmitted X-ray intensity data of each X-ray image, and outputs the data of the X-ray image after correction to the logarithm conversion means 12. The logarithm conversion means 12 is a means of forming an initial projection image every projection angle, which is necessary for the reconstruction part 13 to reconstruct the image from the live and air images. By calculating the logarithm difference of the data of the live and air images, the initial projection image is formed.

The initial projection image is expressed as P0(a,u,v) using the coordinate system (a,u,v) which will be described hereinlater. That is, the initial projection image P0(a,u,v) is calculated by obtaining the logarithm of each data of the live and air images and calculating the difference as shown by the following equation (2).

$$P0(a,u,v) = \log(Iair(a,u,v)) - \log(Ilive(a,u,v)) \quad (2)$$

where, log(x) denotes a natural logarithm of x.

The reconstruction part 13 comprises the means 20a for calculating the initial estimated image, means 20b for calculating the initial differential projection image, filtering means 21, back projection calculation means 22, means 23 for reconstructing the estimated image, means 25 for calculating the extracted vessel image, reprojection calculation part 26, and means 27 for calculating the differential projection image. By executing predetermined processes, which will be described hereinlater, to the image data outputted from the logarithm conversion means 12, data of a three-dimensional reconstruction image is formed.

The means 20a for calculating the initial estimated image reconstructs an X-ray attenuation distribution of the object 6 from the initial projection image calculated by the logarithm conversion means 12 on the basis of the cone beam reconstruction method by Feldkamp written in the above-mentioned literature (1).

In the specification of the invention, the X-ray attenuation distribution of the object 6 reconstructed from the initial projection image is expressed as f0(x,y,z) by using a coordinate system (x,y,z), which will be described hereinlater, and is called an initial estimated image. The detailed procedure will be described hereinlater.

The means 20b for calculating the initial differential projection image is a means for calculating the difference between the vessel projection image acquired by threshold process and reprojection calculation, which will be described hereinlater, and the above-mentioned initial projection image. The image acquired by the means 20b is called an initial differential projection image, which is expressed as Ps(a,u,v) by using the coordinate system (a,u,v) to be described later.

The filtering means 21 corrects both of the initial differential projection image and the projection image calculated by the means 27 for calculating the differential projection image by a correction filter (shown by h(u)) such as a known Shepp-Logan filter. The corrected image is called a filtered projection image.

The backprojection calculation means 22 executes a known backprojection operation. For example, the means 22 reconstructs a three-dimensional image reconstructed from the projection images by using a known filtered backprojection.

The means 23 for reconstructing the estimated image calculates the sum of the three-dimensional reconstruction images of the differential estimated image and the extracted vessel image obtained by the back projection calculation means 22, thereby acquiring an estimated image. The means 23 determines the maximum value and the threshold of the differential estimated image that is inputted. The estimated image is expressed as fest (x,y,z) by using the coordinate system (x,y,z) which will be described hereinlater.

As will be described hereinlater, as internal processes, there are provided a process for obtaining the maximum pixel value of the image (maximum value detecting means), a process for determining a threshold on the basis of the maximum pixel value, and a process (image adding means) for adding the extracted vessel image (extracted image) to the estimated image, thereby obtaining an estimated image.

The reprojection calculation part 24 comprises the means 25 for calculating the extracted vessel image, reprojection calculation part 26, and means 27 for calculating the differential projection image and calculates the differential projection image from the estimated image calculated by the estimated image reconstructing means 23. The means 25 for calculating the extracted vessel image executes a threshold process, which will be described hereinlater, to the estimated image calculated by the means 23, thereby forming the extracted vessel image in which the vessel image is extracted. The reprojection calculation part 26 performs the reprojecting operation, which will be described hereinlater, to the extracted vessel image, thereby converting the three-dimensional reconstructed image to the projection image. The means 27 for calculating the differential projection image calculates the difference between the projection image calculated by the reprojection calculation means 26 and the initial projection image.

Figure 3:
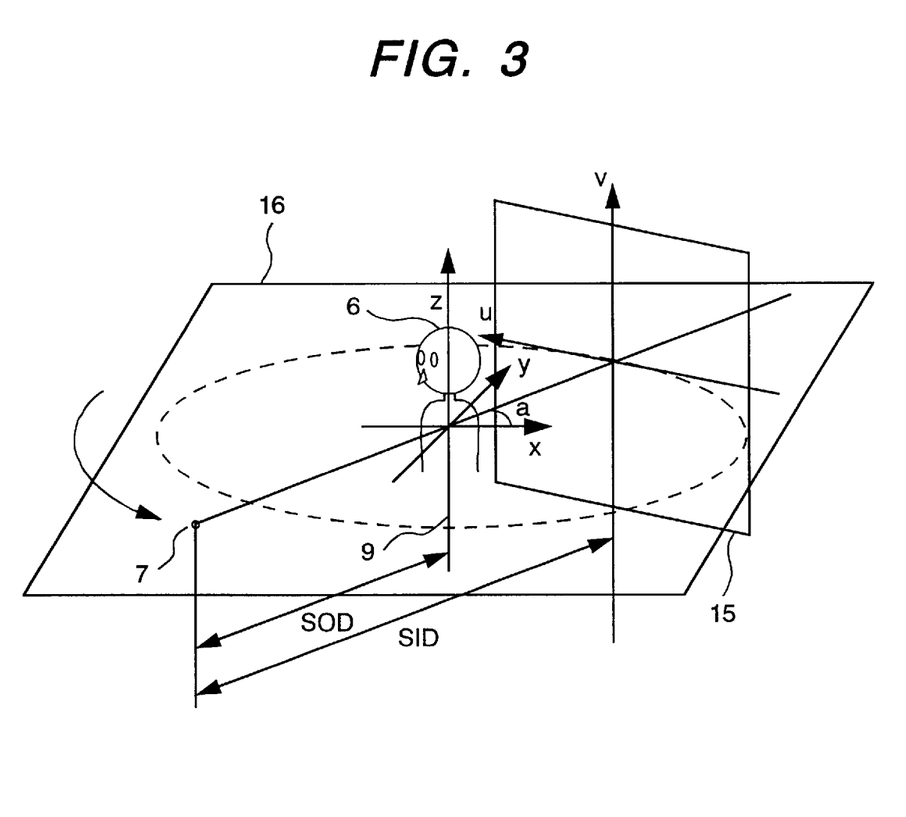
FIG. 3 is a diagram illustrating a geometrical construction of a measuring system in a computerized tomography system.

FIG. 3 is a diagram for explaining a geometrical construction of the measuring system in the computerized tomography system. A projection plane 15 is a virtual two-dimensional plane which is positioned instead of the two-dimensional detector 5. A midplane 16 is a plane of rotation orbit of the X-ray focal spot 7 when the spot 7 turns around the rotation center 9.

A u-axis shows a crossing line drawn when the projection plane 15 and the midplane 16 cross each other. A v-axis is the projection of the rotation center 9 on the projection plane 15 and crosses perpendicularly the u-axis. Reference characters SID denote a distance between the X-ray focal spot 7 and the projection plane 15 and SOD indicate a distance between the X-ray focal spot 7 and the axis 9 of rotation.

Consequently, the position on the projection plane can be expressed by the uv coordinates. x and y axes cross perpendicularly each other and are arbitrarily provided on the midplane 16. They perpendicularly cross the z-axis (axis 9 of rotation). A projection angle (a) is an angle between a straight line connecting the X-ray focal spot 7 and the origin of the uv coordinates and the x axis. An X-ray image acquired by the two-dimensional detector 5 can be expressed by the coordinate system (a,u,v) using the projection angle (a) and the uv coordinates.

Figure 4:
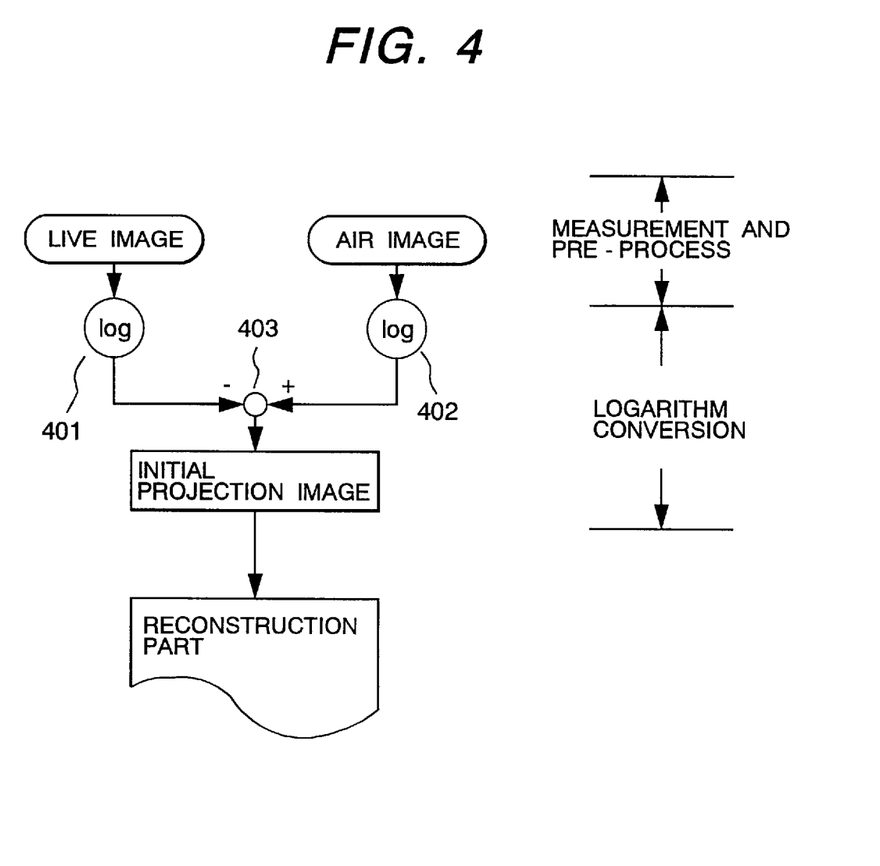
FIG. 4 is a diagram illustrating the operations of a pre-processing means and a logarithm conversion means of the computerized tomography system of the embodiment.
Figure 5:
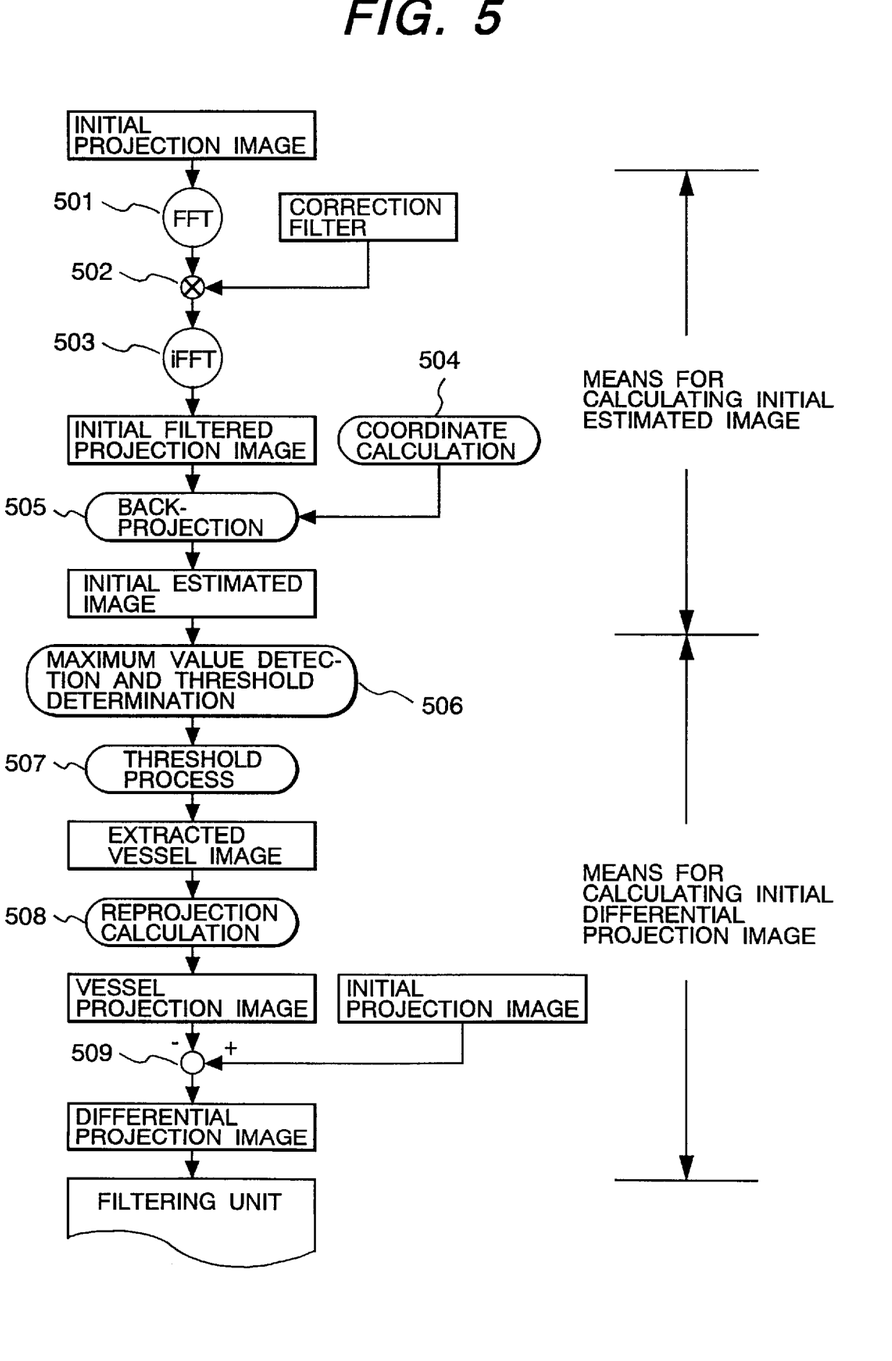
FIG. 5 is a diagram for explaining operations of an initial estimated image calculation means and an initial differential projection image calculation means.
Figure 6:
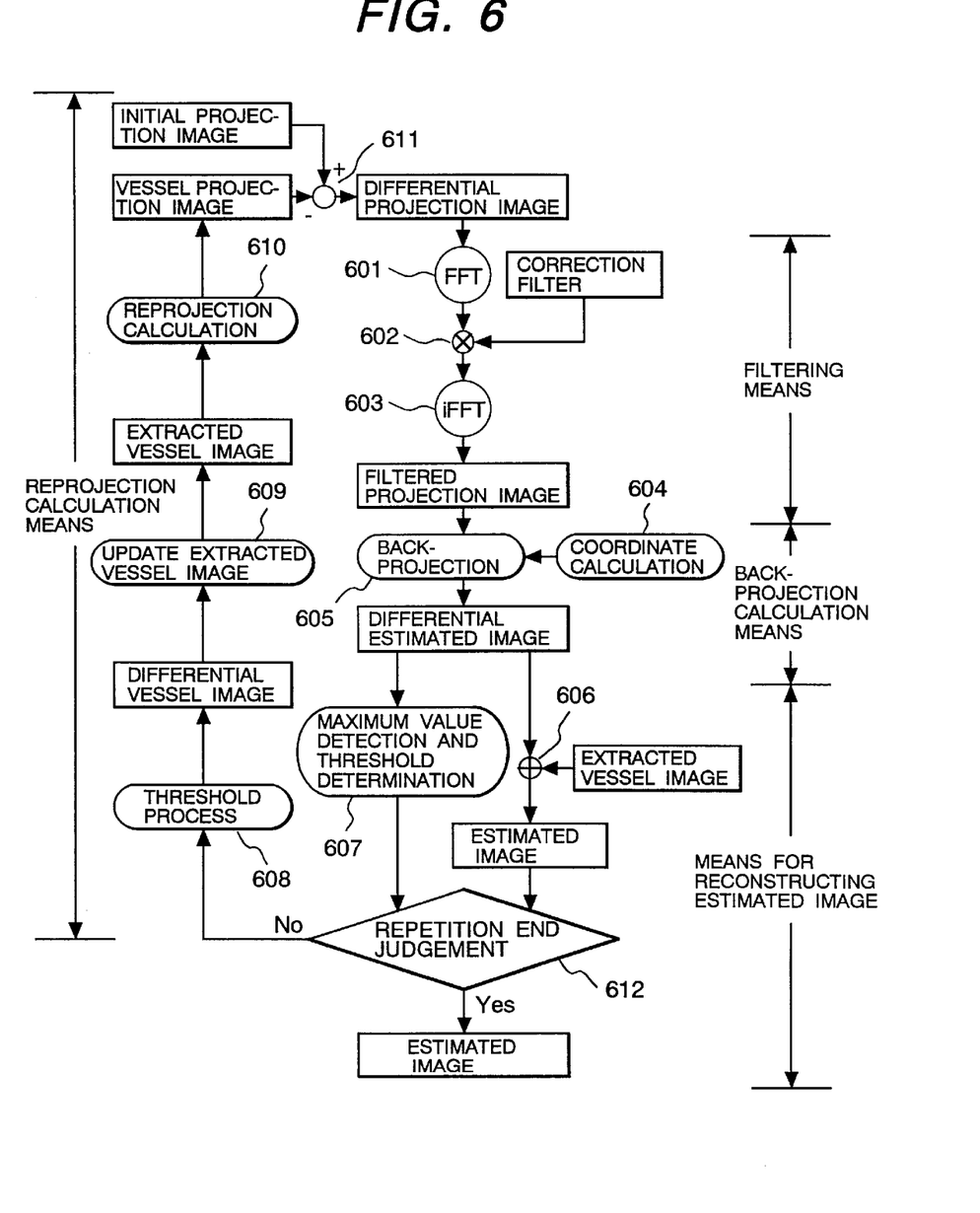
FIG. 6 is a diagram for explaining operations of a filtering means, a backprojection calculation means, an estimated image calculation means, and a reprojection calculation part.

FIG. 4 is a diagram for explaining operations of the pre-processing means and the logarithm conversion means of the computerized tomography system according to the embodiment of the invention. FIG. 5 is a diagram for describing operations of the initial estimated image calculation means and the initial differential projection image calculation means. FIG. 6 is a diagram for explaining operations of the filtering means, backprojection calculation means, estimated image reconstructing means, and reprojection calculation part. The operation of the computerized tomography system will be described hereinbelow with reference to FIGS. 4 to 6.

The operator first injects the contrast medium by the contrast injector 18 via the catheter 17 connected to a desired coronary artery of the object 6 in FIG. 2. The cone beam of X-rays 8 is emitted from the X-ray source 4, the scanner 3 is rotated once, and X-ray images every projection angle (a) are acquired by the two-dimensional detector 5.

The operator acquires the X-ray images and also records the heartbeat of the object 6 by using the electrocardiograph 19. The operator specifies parts in which the phase of the heartbeat is the same from the recording result (graph of the electrocardiogram) and stores the X-ray images which were acquired at the same time as live images into the memory 10. If it is necessary, the correction of the image deformation or the like is performed to the X-ray image to acquire a live image Ilive(a,u,v).

The operator then acquires X-ray images every preset projection angle (a) for the whole circumference of the X-ray source 4 without laying the object 6. The acquired X-ray image is converted to digital signals (transmitted X-ray data), which are stored as an air image into the memory.

Although the air image is acquired after the acquisition of the live image in the embodiment, the invention is not limited to the above. The air image can be also acquired before the acquisition of the live image.

Further, although the acquired air image can be repeatedly used, it is desirable that the parameters when the air image is acquired and those when the live image is acquired are the same.

Also, when the air image is acquired after the acquisition of the live image, an X-ray image (called a mask image) acquired with the same parameters except that the contrast medium is not used can be used instead of the air image. When the mask image is used in place of the air image, the contrast vessel image can be more clearly extracted.

Subsequently, the pre-processing part 11 reads out the live and air images stored in the memory 10 and performs an image correcting operation to each X-ray image. For the live and air images to which the image correcting operation was performed, the logarithm conversion means 12 calculates the logarithm every X-ray image (steps 401, 402) and then calculates the difference between the logarithms in accordance with the above-mentioned equation (2), thereby acquiring the initial projection image P0(a,u,v) (step 403).

The initial projection image P0(a,u,v) is reconstructed by the means 20a which calculates the initial estimated image according to the cone beam reconstruction of Feldkamp described in the literature (1) to an initial estimated image f0(x,y,z) indicative of the X-ray attenuation coefficient distribution of the object 6. This process is executed in such a manner that, as shown in FIG. 5, the initial projection image P0(a,u,v) is corrected by the correction filter h(u) such as the Shepp-Logan filter and calculated by using the following equation (3), thereby acquiring an initial filtered projection image Qo(a,u,v) (steps 501, 502, 503).

$$Qo(a,u,v) = iFFT\left\{ FFT\left\{ \frac{SOD}{\sqrt{SOD^2 + u^2 + v^2}} P(a, u, v) \right\} \cdot FFT\{h(u)\} \right\} \quad (3)$$

where, FFT{ } denotes a Fourier transformation regarding u and iFFT{ } denotes an inverse Fourier transformation regarding u. Since discrete data is transformed in the embodiment, a fast Fourier transform algorithm is used.

Subsequently, the initial estimated image f0(x,y,z) as the X-ray attenuation coefficient distribution of the object 6 is obtained from the initial filtered projection image Q0(a,u,v) by the backprojection. When a point (u',v') to be backprojected for the point (x,y,z) is used as backprojection coordinates of the point (x,y,z) at the projection angle (a), the backprojection coordinates (u', v') to be backprojected for the point (x,y,z) at the projection angle (a) are calculated by the following expression (4) (step 504).

$$u' = \frac{SID}{SOD + x\cos(a) + y\cos(a)} \cdot (-x\sin(a) + y\cos(a)) \quad (4)$$

$$v' = \frac{SID}{SOD + x\cos(a) + y\cos(a)} \cdot z$$

The backprojection coordinates are determined only by the geometrical construction of the measurement measurement part 1 irrespective of the object 6 and the condition of measuring. Consequently, the calculation result of the backprojection coordinates can be also used in the backprojection in iterative step which will be described later. In the embodiment, the backprojection coordinates for the point (x,y,z) when the projection angle is 0 are stored in the memory of a computer. In the backprojection in the iterative step, by making a point (x cos(a)+y sin(a), −sin(a)+y cos(a), z) at the projection angle 0 correspond to the point (x,y,z) at the projection angle (a), the backprojection coordinates at the projection angle (a) are determined from the back projection coordinates when the projection angle is 0.

According to another method, the backprojection coordinates (u', v') are once calculated with respect to all of the projection angles (a) and the coordinates (x,y,z) and the results are stored in a large scale memory such as a hard disk and are used for every reconstruction calculation.

The backprojection calculation is performed to the initial estimated image fo(x,y,z) according to the following equation (5) (step 505).

In this case, since the reconstructed image is specifically a collection of discrete data, the backprojection is performed to the coordinates (x,y,z) corresponding to the positions of the discrete points in accordance with the equation (5).

$$f0(x,y,z) = \int_0^{2\pi} \frac{SOD^2}{(SOD + x\cos(a) + y\cos(a))^2} Q0(a,u',v')da \qquad (5)$$

In the 20b for calculating the initial differential projection image, the maximum value Max(f0(x,y,z)) of the initial estimated image f0(x,y,z) is obtained (step 506).

The coronary artery into which the contrast medium is injected have the X-ray attenuation coefficient value higher than the other regions. It is, therefore, possible to judge that the reconstruction point of the initial estimated image having a value close to the maximum value Max[f0(x,y,z)] is the coronary artery part. A threshold is determined by multiplying the maximum value Max[f0(x,y,z)] by a weight coefficient $\alpha$ which is larger than 0 and is equal to or less than 1. The threshold process is executed by using the threshold.

The threshold process in the embodiment denotes a process for storing the value at the reconstruction point having a value equal to or larger than the threshold and setting the value at the reconstruction point having a value less than the threshold to zero. In order to extract only the blood vessel part, it is necessary to properly regulate the value of the weight coefficient $\alpha$. In case of the coronary artery, the threshold is determined by using, specifically speaking, a value approximately from 0.8 to 0.9 (step 506).

With the threshold determined as mentioned above, the threshold process is executed to the initial estimated image f0(x,y,z) in accordance with the following equation (6) (step 507).

$$fv(x,y,z) = \text{Thred}[f0(x,y,z)]$$

where, $$\text{Thred}[f] = \begin{cases} f & f \geq \tau \\ 0 & f < \tau \end{cases} \qquad (6)$$

$$\tau = \alpha \text{Max}[f0(x, y, z)]$$

In the equation (6), reference characters Thred denotes a function for executing the threshold process.

In order to acquire the projection image in the computed tomography system of the extracted vessel image fv(x,y,z), the reprojection calculation is executed according to the following equation (7) (step 508).

$$Pv(a, u, v) = \int_{L(a,u,v)} fv(x, y, z)dl$$

where, $$L(a, u, v): \frac{x + SOD\cos(a)}{SID\cos(a) - u\sin(a)} = \frac{y - SOD\sin(a)}{SID\sin(a) - u\cos(a)} = \frac{z}{v} \qquad (7)$$

The projection angle (a) here is the same as the projection angle when the initial projection image is acquired. A projection image Pv(a,u,v) (hereinlater, called a vessel projection image) is an image when only the extracted vessel image fv(x,y,z) of the object 6 is acquired.

That is, a straight line (expressed as L(a,u,v) of the equation (7)) is drawn between the point (a,u,v) on the projection plane 15 at the projection angle (a) and a position (−SOD cos(a), −SOD sin(a), 0) of the X-ray focal spot 7 at the projection angle (a) and the vessel projection image is acquired by the sum of the extracted vessel images fv(x,y,z) existing on the straight line. Since the projection image is discrete data in reality, in the embodiment, the vessel projection image is treated as discrete data of every element constructing the projection image. The difference between the vessel projection image Pv(a,u,v) acquired in step 508 and the initial projection image Po(a,u,v) acquired by the logarithm conversion means 12 is calculated according to the following equation (8), thereby obtaining a differential projection image Ps(a,u,v) (step 509).

That is, since the projection image is the discrete data, by calculating the difference every element, the differential projection image can be acquired.

$$Ps(a,u,v) = P0(a,u,v) - Pv(a,u,v) \qquad (8)$$

The differential projection image Ps(a,u,v) is a projection image of the object 6, which does not include the extracted vessel image fv(x,y,z). As shown in FIG. 6, both of the filtering process (steps 601 to 603) of the following equation (9) which is the same as the processes shown in steps 501 to 503 and the backprojection calculating process (steps 604 and 605) of the following equation (10) which is the same as the process shown in step 505 are performed to the differential projection image Ps(a,u,v) to reconstruct the differential projection image, thereby acquiring a differential estimated image fs(x,y,z).

$$Q_{(a,u,v)} = \qquad (9)$$

$$iFFT\left\{ FFT\left\{ \frac{SOD}{\sqrt{SOD^2 + u^2 + v^2}} P(a, u, v) \right\} \cdot FFT\{h(u)\} \right\}$$

$$f(x, y, z) = \int_0^{2\pi} \frac{SOD^2}{(SOD + x\cos(a) + y\cos(a))^2} Q(a, u', v')da$$

where, $$u' = \frac{SID}{SOD + x\cos(a) + y\cos(a)} \cdot (-x\sin(a) + y\cos(a)) \qquad (10)$$

$$v' = \frac{SID}{SOD + x\cos(a) + y\cos(a)} \cdot z$$

The differential estimated image fs(x,y,z) is an image reconstructed from the projection images of the object 6, from which the extracted vessel image fv(x,y,z) is removed. Consequently, the radial artifacts occurred around the blood vessels due to the existence of the extracted vessel image can be reduced.

By obtaining the sum of the differential estimated image fs(x,y,z) and the extracted vessel image fv(x,y,z), an estimated image fest(x,y,z) expressed by the following equation (11) can be acquired as an estimated image of the coronary artery, in which the artifacts are reduced (step 606).

$$fest\ (x,y,z) = fv(x,y,z) + fs(x,y,z) \quad (11)$$

Further, according to the embodiment, in order to repetitively perform the foregoing processes, after the means 23 for reconstructing the estimate image detects the maximum pixel value of the differential estimated image and determines the threshold in a manner similar to the procedures in steps 506 and 507 (step 607), the means 25 for calculating the extracted vessel image executes the threshold process on the basis of the obtained threshold, thereby calculating a differential vessel image fsv(x,y,z) (step 608).

Since the threshold for the differential estimated image fs(x,y,z) is decreased as compared with the threshold for the initial estimated image, a new blood vessel is extracted in the differential vessel image.

By using the result, the means 25 for calculating the extracted vessel image updates the extracted vessel image fv(x,y,z) according to the following equation (12) to acquire a new extracted vessel image fv'(x,y,z) (step 609).

$$fv'(x,y,z) = fsv(x,y,z) + fv(x,y,z) \quad (12)$$

As mentioned above, the reprojection calculation means 26 executes again the reprojection calculation having the same contents as those in step 508 to the extracted vessel image fv'(x,y,z) updated by the means 25, thereby enabling a vessel projection image Pv'(a,u,v) to be acquired (step 610).

The means 27 for calculating the differential projection image calculates the difference between the extracted vessel image Pv'(a,u,v) and the initial projection image P0(a,u,v) on the basis of the following equation (13) (step 611). The obtained differential projection image Ps'(a,u,v) is inputted to the filtering means 21. The processes of steps 601 to 607 are performed again. Consequently, an estimated image fest'(x,y,z) in the next iteration can be acquired by the calculation.

$$Ps'(a,u,v) = P0(a,u,v) - Pv'(a,u,v) \quad (13)$$

The condition to finish the iteration, namely, whether the threshold process in step 608 is executed again or not to the estimated image acquired in step 606 is judged in step 612 depending on whether the threshold for the differential estimated image fs(x,y,z) acquired in step 605 is smaller than the empirically obtained X-ray attenuation coefficient of the contrast medium injected vessel or not. In the embodiment, when it is smaller than the X-ray attenuation coefficient, the iteration is finished.

In the embodiment, it is obviously understood that the operator performs the image process while confirming the extraction result of region of interest of the coronary artery and the iteration process can be finished on the basis of an instruction of the operator.

In this case, however, a process for judgement to finish the iterating process by the instruction of the operator is necessary in step 612 of the means 23 for reconstructing the estimated image.

The estimated image acquired as mentioned above is converted to a three-dimensional reconstructed image by the imaging means 14, which is displayed on a display (not shown).

Further, for example, the estimated image may be also stored in a storage such as a magnetic disk apparatus (not shown) or the like or can be transferred to another information processing apparatus or the like via a communication line (not shown). The estimated image is equivalent to an image which is reconstructed in such a manner that the contrast vessels of the object 6 and the background are separated. The radial artifacts due to the contrast coronary artery can be consequently removed and branches of a fine vessel and the like can be also extracted.

As mentioned above, in the computed tomography system of the embodiment, the logarithm difference between the air image and the live image each having the same projection angle is calculated by the logarithm conversion means 12, thereby acquiring the initial projection image. Subsequently, the processes shown below are iterated to estimate the vessel image.

(a) The means 20a for calculating the initial estimated image performs the reconstruction process by executing the filtering process and the backprojection calculating process to the initial projection image and calculates the initial estimated image.

(b) The threshold is determined from the maximum value of the initial estimated image.

(c) The threshold process using the threshold determined in (b) is performed to the initial estimated image and the region having the high pixel value are extracted, thereby forming the extracted vessel image.

(d) The extracted vessel image is reprojected and the differential projection image between the acquired vessel projection image and the initial projection image is acquired.

(e) The reconstruction process is executed by performing the filtering and backprojection calculating processes to the differential projection image, thereby acquiring the differential estimated image.

(f) The threshold is determined from the maximum value of the differential estimated image acquired in (e).

(g) The sum of the extracted vessel image and the differential estimated image is set to the estimated image every iteration process.

(h) The threshold process is performed to the differential estimated image by using the threshold obtained in (f) to extract the region having the high pixel value, thereby acquiring the differential extracted vessel image. Further, the differential extracted vessel image is added to the extracted vessel image and the resultant image is used as a new extracted vessel image.

(i) When the threshold obtained in (f) is smaller than the empirically obtained X-ray attenuation coefficient of the blood vessel to which the contrast medium is injected, the estimated image is used as a finial three-dimensional reconstructed image, the iterating process is finished, the imaging process is executed by the imaging means 14, and the resultant image is displayed on the display (not shown). On the other hand, when the threshold is not smaller than the X-ray attenuation coefficient, the processing routine is returned to (d).

By iterating the processes shown in (d) to (h) as mentioned above, the process to extract the vessel can be performed a plurality of times and the threshold as a judgment reference when the vessel region is extracted can be changed on the basis of the calculated estimated image. Consequently, the radial artifacts due to the contrast vessels can be removed. Since the radial artifacts due to the contrast vessels can be removed, the branches of the fine vessel and the like can be also extracted.

As mentioned above, according to the invention, the three-dimensional reconstructed image having no artifact can be acquired from the small number of projection data.

Although the embodiment of the invention has been specifically described above, the invention is not limited to the foregoing embodiments. It is obviously understood that the invention can be variably modified without departing from the scope of the invention.

We claim:

1. A computerized tomography system comprising:
   an X-ray source for emitting X-rays in a cone beam shape;
   two-dimensional X-ray image acquiring means which is arranged so as to face the X-ray source and acquires an image of an object by using the X-rays;
   rotating means for rotating the X-ray source and the two-dimensional X-ray image acquiring means around the object; and
   iterative reconstruction means for forming a three-dimensional reconstructed image from projection images acquired by the two-dimensional X-ray image acquiring means while rotating the rotating means,
   wherein the iterative reconstruction means includes:
   reconstruction means for acquiring the three-dimensional reconstructed image from the projection images;
   estimated image calculation means for acquiring an estimated image from the three-dimensional reconstructed image;
   reprojection calculation means for acquiring a projection image from the three-dimensional reconstructed image; and
   iterative means for repeatedly executing the calculations by the reconstruction means, the estimated image calculation means, and reprojection calculation means, and
   the estimated image calculation means includes:
   maximum value detecting means for obtaining the maximum value of the three-dimensional reconstructed image;
   threshold calculation means for calculating a threshold according to the maximum value;
   extracted image calculation means for extracting a region in which the value is equal to or larger than threshold or the value is equal to or less than the threshold from the estimated image, thereby acquiring an extracted image; and
   image adding means for adding the three-dimensional reconstructed image and the extracted image acquired by the previous iterative reconstruction calculation, thereby acquiring an estimated image.

2. A computerized tomography system comprising:
   an X-ray source for emitting X-rays in a cone beam shape;
   two-dimensional X-ray image acquiring means which is arranged so as to face the X-ray source and acquires an image of an object by using the X-rays;
   rotating means for rotating the X-ray source and the two-dimensional X-ray image acquiring means around the object; and
   iterative reconstruction means for forming a three-dimensional reconstructed image from projection images acquired by the two-dimensional X-ray image acquiring means while rotating the rotating means,
   wherein the itrative reconstruction means includes:
   reconstruction means for acquiring the three-dimensional reconstructed image from the projection images;
   estimated image calculation means for acquiring an estimated image from the three-dimensional reconstructed image;
   reprojection calculation means for acquiring a projection image from the three-dimensional reconstructed image; and
   iterating means for repeatedly executing the calculations by the reconstruction means, the estimated image calculation means, and the reprojection calculation means, and
   the estimated image calculation means includes:
   maximum value detecting means for obtaining the maximum value of the three-dimensional reconstructed image;
   threshold calculation means for calculating a threshold according to the maximum value;
   extracted image calculation means for extracting a part in which the value is equal to or larger than the threshold or the value is equal to or less than the threshold from the estimated image, thereby acquiring an extracted image; and
   image adding means for adding the three-dimensional reconstructed image and an extracted image acquired by the previous iterative reconstructing calculation, thereby acquiring an estimated image, and
   the iterating means has means for finishing iteration of the calculations according to the threshold.

3. The system according to any one of claims 1, to 2, wherein the iterating means comprises:
   means for showing the estimated image to the operator; and
   means for finishing the iterative operation when the operator observes the estimated image shown and determines to finish the operation.

4. A computerized tomography system comprising:
   an X-ray source for emitting X-rays in a cone beam shape;
   two-dimensional X-ray image acquiring means which is arranged so as to face the X-ray source and acquires an image of an object by using the X-rays;
   rotating means for rotating the X-ray source and the two-dimensional X-ray image acquiring means around the object; and
   iterative reconstruction means for forming a three-dimensional reconstructed image from projection images acquired by the two-dimensional X-ray image acquiring means while rotating the rotating means,
   wherein the iterative reconstruction means includes:
   reconstruction means for acquiring the three-dimensional reconstructed image from the projection images;
   estimated image calculation means for acquiring an estimated image from the three-dimensional reconstructed image;
   reprojection calculation means for acquiring a projection image from the three-dimensional reconstructed image; and
   iterating means for repeatedly executing the calculations by the reconstruction means, the estimated image calculation means, and the reprojection calculation means, and
   the reprojection calculation means includes:
   image processing means for performing a threshold process to the three-dimensional reconstructed image on the basis of the threshold and adding the threshold processed image to the extracted image acquired by the previous iterating operation, thereby acquiring an extracted image;
   reprojection calculation means for acquiring a projection image by reprojecting the extracted image acquired by the image processing means; and difference calculation means for calculating the difference between the projection image acquired by the reprojection calculation means and the projection image acquired by the two-dimensional X-ray image acquiring means, thereby acquiring a differential projection image.

5. A computerized tomography system comprising:

an X-ray source for emitting X-rays in a cone beam shape;

two-dimensional X-ray image acquiring means which is arranged so as to face the X-ray source and acquires an image of an object by using the X-rays;

rotating means for rotating the X-ray source and the two-dimensional X-ray image acquiring means around the object; and iterative reconstruction means for forming a three-dimensional reconstructed image from projection images acquired by the two-dimensional X-ray image acquiring means while rotating the rotating means, wherein the iterative reconstruction means includes:

reconstruction means for acquiring the three-dimensional reconstructed image from the projection images;

estimated image calculation means for acquiring an estimated image from the three-dimensional reconstructed image;

reprojection calculation means for acquiring a projection image from the three-dimensional reconstructed image; and iterating means for repeatedly executing the calculations by the reconstruction means, the estimated image calculation means, and the reprojection calculation means, and the estimated image calculation means includes:

maximum value detecting means for obtaining the maximum value of the three-dimensional reconstructed image;

threshold calculation means for calculating a threshold according to the maximum value;

extracted image calculation means for extracting a part in which the value is equal to or larger than the threshold or the value is equal to or less than the threshold from the estimated image, thereby acquiring an extracted image; and image adding means for adding the three-dimensional reconstructed image and an extracted image acquired by the previous iterative reconstruction calculation, thereby acquiring an estimated image, and the reprojection calculation means includes:

image processing means for performing a threshold process to the three-dimensional reconstructed image on the basis of the threshold and adding the threshold processed image to the extracted image acquired by the previous iterating operation, thereby acquiring an extracted image;

reprojection calculation means for acquiring a projection image by reprojecting the extracted image acquired by the image processing means; and difference calculation means for calculating the difference between the projection image acquired by the reprojection calculation means and the projection image acquired by the two-dimensional X-ray image acquiring means, thereby acquiring a differential projection image.

6. A computerized tomography system comprising:

an X-ray source for emitting X-rays in a cone beam shape;

two-dimensional X-ray image acquiring means which is arranged so as to face the X-ray source and acquires an image of an object by using the X-rays;

rotating means for rotating the X-ray source and the two-dimensional X-ray image acquiring means around the object; and iterative reconstruction means for forming a three-dimensional reconstructed image from projection images acquired by the two-dimensional X-ray image acquiring means while rotating the rotating means, wherein the repetitive reconstruction means includes:

reconstruction means for acquiring the three-dimensional reconstructed image from the projection images;

estimated image calculation means for acquiring an estimated image from the three-dimensional reconstructed image;

reprojection calculation means for acquiring a projection image from the three-dimensional reconstructed image; and iterating means for repeatedly executing the calculations by the reconstruction means, the estimated image calculation means, and the reprojection calculation means and for finishing the iteration of the calculations according to the threshold, and the estimated image calculation means includes:

maximum value detecting means for obtaining the maximum value of the three-dimensional reconstructed image;

threshold calculation means for calculating a threshold according to the maximum value;

extracted image calculating means for extracting a region in which the value is equal to or larger than the threshold or the value is equal to or less than the threshold from the estimated image, thereby acquiring an extracted image; and image adding means for adding the three-dimensional reconstructed image and an extracted image acquired by the previous iterative reconstruction calculation, thereby acquiring an estimated image, and the reprojection calculation means includes:

image processing means for performing a threshold process to the three-dimensional reconstructed image on the basis of the threshold and adding the threshold processed image to the extracted image acquired by the previous iterating operation, thereby acquiring an extracted image;

reprojection calculation means for acquiring a projection image by reprojecting the extracted image acquired by the image processing means; and difference calculation means for calculating the difference between the projection image acquired by the reprojection calculation means and a projection image acquired by the two-dimensional X-ray image acquiring means, thereby acquiring a differential projection image.

7. The system according to any one of claims 4 to 6, wherein the reprojection calculation means calculates the projection image in accordance with the following expression (1) when a u axis is set in the tangent direction of the roation on an imaging plane of the two-dimensional X-ray image acquiring means, a v axis is set in parallel to the axis of rotation, the axis of rotation of the rotating means is set to a z axis, axes which perpendicularly cross each other having a crossing point, as the origin, with the z axis on the plane drawn by the rotating X-ray source are set to x and y axes, a distance between the X-ray source and the axis of rotation is set to SOD, a distance between the X-ray source and the two-dimensional X-ray image acquiring means is set to SID, the extracted image is set to fv(x,y,z), and a projection image for a projection angle (a) is set to Pv(a,u,v) wherein $$Pv(a,u,v) = \int_{L(a,u,v)} fv(x, y, z) dl$$

where, $$L(a, u, v): \frac{x + SOD \cos(a)}{SID \cos(a) - u \sin(a)} = \frac{y - SOD \sin(a)}{SID \sin(a) - u \cos(a)} = \frac{z}{v} \quad (1)$$

\* \* \* \* \*